(12) United States Patent
Dannoux

(10) Patent No.: US 8,281,619 B2
(45) Date of Patent: Oct. 9, 2012

(54) STACK PROGRESSIVE PRESSING FOR MAKING SHAPED ARTICLES

(75) Inventor: Thierry Luc Alain Dannoux, Avon (FR)

(73) Assignee: Corning Incorporated, Corning, NY (US)

(*) Notice: Subject to any disclaimer, the term of this patent is extended or adjusted under 35 U.S.C. 154(b) by 358 days.

(21) Appl. No.: 12/774,177

(22) Filed: May 5, 2010

(65) Prior Publication Data

US 2010/0300152 A1 Dec. 2, 2010

Related U.S. Application Data

(60) Provisional application No. 61/182,158, filed on May 29, 2009.

(51) Int. Cl.
*C03B 23/023* (2006.01)
*C03B 23/03* (2006.01)

(52) U.S. Cl. ............... 65/106; 65/102; 65/107

(58) Field of Classification Search ........... 65/106, 65/107
See application file for complete search history.

(56) References Cited

U.S. PATENT DOCUMENTS

| | | | | |
|---|---|---|---|---|
| 2,452,488 A * | 10/1948 | Paddock et al. | ........... | 65/103 |
| 3,414,395 A * | 12/1968 | Reese et al. | ........... | 65/107 |
| 3,560,182 A * | 2/1971 | Golightly | ........... | 65/107 |
| 3,560,183 A * | 2/1971 | Stilley et al. | ........... | 65/107 |
| 3,589,880 A * | 6/1971 | Clark | ........... | 65/17.5 |
| 3,607,188 A * | 9/1971 | Stilley et al. | ........... | 65/106 |
| 3,922,156 A * | 11/1975 | Martin | ........... | 65/272 |
| 4,119,424 A * | 10/1978 | Comperatore | ........... | 65/107 |
| 5,368,625 A | 11/1994 | Mizusugi | | |
| 6,158,247 A * | 12/2000 | Didelot | ........... | 65/106 |
| 7,302,813 B2 * | 12/2007 | Balduin et al. | ........... | 65/106 |
| 7,666,511 B2 | 2/2010 | Ellison et al. | | |
| 7,926,303 B2 * | 4/2011 | Chang | ........... | 65/305 |

* cited by examiner

*Primary Examiner* — Jason L. Lazorcik
(74) *Attorney, Agent, or Firm* — Walter M. Douglas

(57) ABSTRACT

A method for forming shaped articles (28') includes preparing a stack (26) having at least an adjacent set (27) of preformed material (28) and forming mold (30), where the preformed material (28) has an edge portion (34) that extends beyond a periphery of the forming mold (30), and the forming mold (30) has an external surface (32) with a desired surface profile of a shaped article. The stack (28) is heated. The stack (28) is advanced through a constriction (56) that has an internal surface configured to fold the edge portion (34) of the preformed material (28) into contact with the external surface (32) of the forming mold (30) as the edge portion (34) passes through the constriction (56), thereby forming a shaped article (28') from the preformed material (28). The shaped article (28') is then separated from the forming mold (30).

12 Claims, 5 Drawing Sheets

STACK PROGRESSIVE PRESSING FOR MAKING SHAPED ARTICLES

CROSS-REFERENCE TO RELATED APPLICATIONS

This application claims the benefit of priority under 35 U.S.C. §119(e) of U.S. Provisional Application Ser. No. 61/182,158 filed on May 29, 2009.

FIELD

The invention relates generally to techniques for making shaped articles. More specifically, the invention relates to a method and an apparatus for reforming a sheet of material, e.g., a glass sheet, into a shaped article.

BACKGROUND

Pressing techniques for making shaped glass articles generally fall into one of two categories. In the first category, molten glass is used as a starting material. The molten glass, in the form of a gob, is pressed into a desired shape with a plunger. Where the molten glass has to be spread thinly to make a thin-walled glass article having complex curvatures, the molten glass may become cold, or form a cold skin, before reaching the final desired shape. Shaped glass articles formed from pressing a gob of molten glass may exhibit one or more of shear marking, warping, optical distortion due to low surface quality, and overall low dimensional precision. In the second category, preformed glass is used as a starting material. The preformed glass is reheated to a low viscosity and then pressed into a shaped article. This disclosure relates to the second category of pressing techniques.

U.S. Pat. No. 5,368,625 (Mizusugi) and U.S. Pat. No. 6,158,247 (Didelot) describe pressing techniques according to the second category. In the Mizusugi patent, a preformed glass is made into a preliminary bent shape. The bent preformed glass is then transferred to a press, where it is pressed into a desired shape between an upper die and a lower die. In the Didelot patent, a stack of two glass sheets is formed, with a separating agent interposed between the glass sheets. The glass sheets are heated and sagged by gravity onto a frame. A shaping part is brought into contact with the glass sheets to shape a central region of the glass sheets. The frame includes cross members, which are pivoted to bring an edge region of the glass sheets into contact with the sides of the shaping part, thereby forming the shaped article.

SUMMARY

In a first aspect, a method for making shaped articles includes preparing a stack having at least one adjacent set of preformed material and forming mold, where the preformed material has an edge portion that extends beyond a periphery of the forming mold, and the forming mold has an external surface with a desired surface profile of a shaped article. The method includes heating the stack. The method includes advancing the stack through a constriction that has an internal surface configured to fold the edge portion of the preformed material into contact with the external surface of the forming mold as the edge portion passes through the constriction, thereby forming a shaped article from the preformed material. The method includes separating the shaped article from the forming mold.

In the preparing the stack step, the preformed material may contain glass. In the heating the stack step, the stack may be heated to a forming temperature near a softening point of the glass. The forming temperature may be approximately 10° C. to 70° C. below a softening point of the glass. In the heating the stack step, a temperature differential may exist between the periphery of the stack and the center of the stack. The temperature differential may be in a range from 30° C. to 80° C. The method may further include cooling the stack to a removal temperature below the forming temperature. The removal temperature may be below a strain point of the glass. The removal temperature may be at least 10° C. below the strain point of the glass.

The stack prepared in the preparing the stack step may include a plurality of the adjacent set of preformed material and forming mold so that the advancing the stack step results in adjacent sets of shaped articles and forming molds.

For the stack having a plurality of the adjacent set of preformed material and forming mold, the method may further include adding adjacent sets of preformed materials and forming molds to the end of the stack upstream of the constriction and removing adjacent sets of shaped articles and forming molds from the end of the stack downstream of the constriction.

For the stack having a plurality of the adjacent set of preformed material and forming mold, each of the preformed materials may contain glass, and a portion of the stack upstream of the construction may be heated to a forming temperature below a softening point of the glass in the heating the stack step. The method may further include cooling a portion of the stack downstream of the constriction to a removal temperature below a strain point of the glass.

For the stack having a plurality of the adjacent set of preformed material and forming mold, where each of the preformed materials contains glass, the method may include at least one of annealing the shaped articles, finishing the shaped articles, and chemically-strengthening the shaped articles.

The method may further include applying a compressive force to the stack while heating the stack and advancing the stack through the constriction.

The method may also include providing an inert atmosphere around the stack at least while heating the stack.

In a second aspect, a system for making shaped articles includes a stack having at least an adjacent set of preformed material and forming mold, where the preformed material has an edge portion that extends beyond a periphery of the forming mold, and the forming mold has an external surface with a desired surface profile of a shaped article. The system includes a channel for receiving the stack. The system includes a heater disposed adjacent to the channel for heating the stack. The system also includes a constriction disposed at a selected position in the channel. The constriction has an internal surface configured to fold the edge portion of the preformed material into contact with the external surface of the forming mold as the stack advances through the constriction.

The system may include a motion device for conveying the stack through the channel and constriction. The system may include a weight member for applying a compressive force to the stack. The system may include a centralizer for centralizing the stack within the channel. The heater of the system may be a circumferential heater. The forming mold in the stack of the system may have a coefficient of thermal expansion within $\pm 20 \times 10^{-7}/°$ C. of the coefficient of thermal expansion of the preformed material. The preformed material in the stack of the system may be a flat sheet of glass-containing material.

In a third aspect, an apparatus for making shaped articles includes a channel configured to receive a stack having at least an adjacent set of preformed material and forming mold, where the preformed material has an edge portion that extends beyond a periphery of the forming mold, and the forming mold has an external surface with a desired surface profile of a shaped article. The apparatus includes a heater disposed adjacent to the channel for heating the stack. The apparatus includes a constriction disposed at a selected position in the channel. The constriction comprises a ring member having an internal surface configured to fold the edge portion of the preformed material into contact with the external surface of the forming mold as the edge portion passes through the constriction.

The foregoing aspects will be described in more detail in the following description.

BRIEF DESCRIPTION OF DRAWINGS

The accompanying drawings, described below, illustrate typical embodiments of the invention and are not to be considered limiting of the scope of the invention, for the invention may admit to other equally effective embodiments. The figures are not necessarily to scale, and certain features and certain views of the figures may be shown exaggerated in scale or in schematic in the interest of clarity and conciseness.

DETAILED DESCRIPTION

Figure 1:
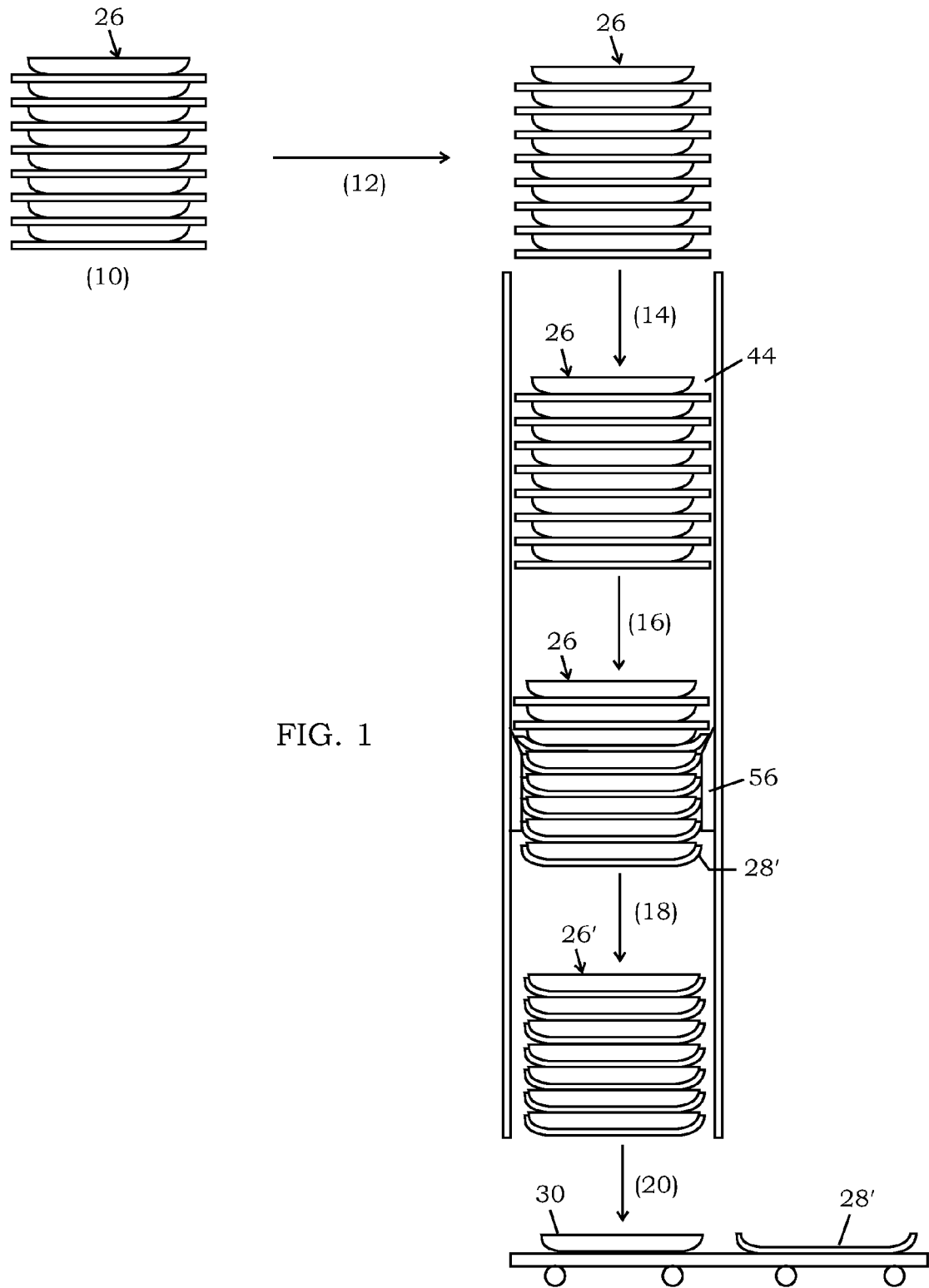
FIG. 1 is a diagram illustrating a sequence of steps in a method for making shaped articles.

FIG. 1 is a simplified diagram illustrating a sequence of steps in a method for making shaped articles. The method starts with preparation of a stack 26 of preformed materials and forming molds (10). The stack 26 is transported, as shown at arrow 12, to a heated channel 44. The stack 26 is conveyed, as shown at arrow 14, along the heated channel 44 so that the preformed materials in the stack 26 are heated to a low viscosity or to a forming temperature at which the preformed materials can be reformed. Shaped articles 28' are formed by advancing the stack 26 through a structure 56 that provides a constriction or "funnel" (described in more detail below) at a selected position in the heated channel 44, as shown at arrow 16. As the stack 26 passes through the constriction provided by the structure 56, the preformed materials in the stack 26 encounter an internal surface of the constriction, which is configured to fold an edge portion of each preformed material into contact with an external surface of an adjacent forming mold, thereby forming the shaped article. The method includes cooling down the shaped articles 28' to a temperature below the forming temperature, as shown by arrow 18. The shaped articles 28' are then separated from the forming molds 30, as shown by arrow 20. The shaped articles 28' may be subjected to auxiliary processes, such as annealing, finishing, and strengthening.

Figure 2:
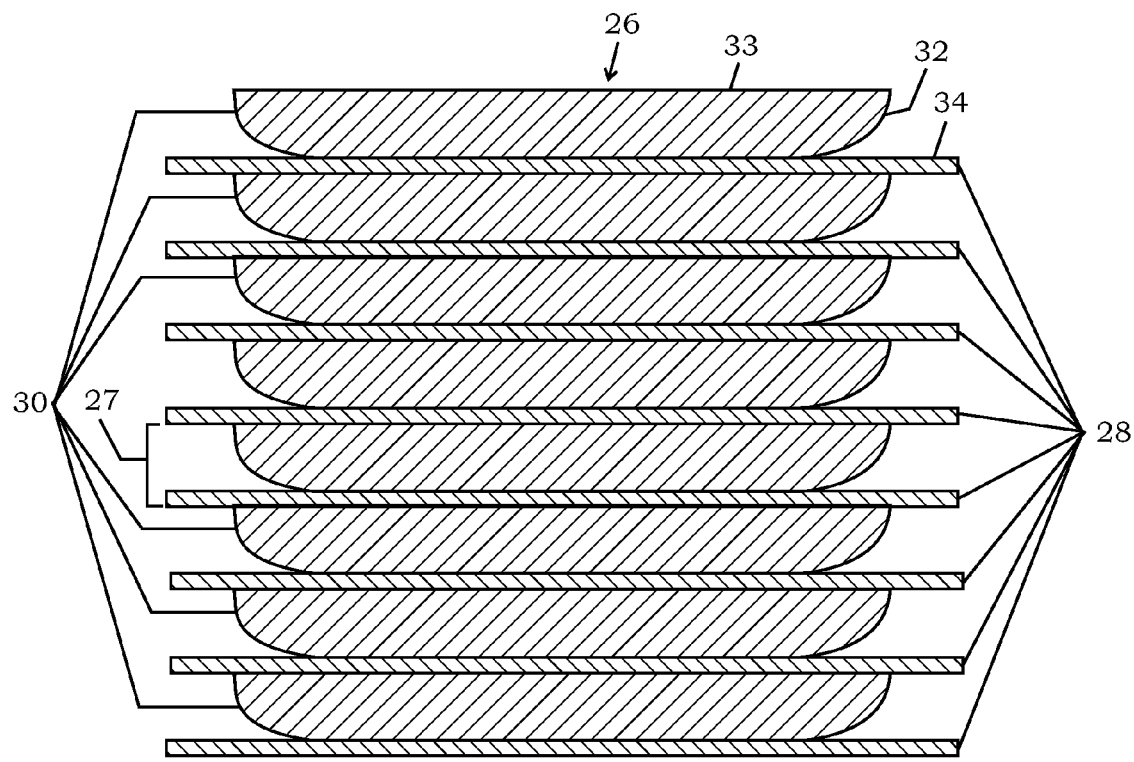
FIG. 2 is a cross-section of a stack of preformed materials and forming molds.
Figure 3:
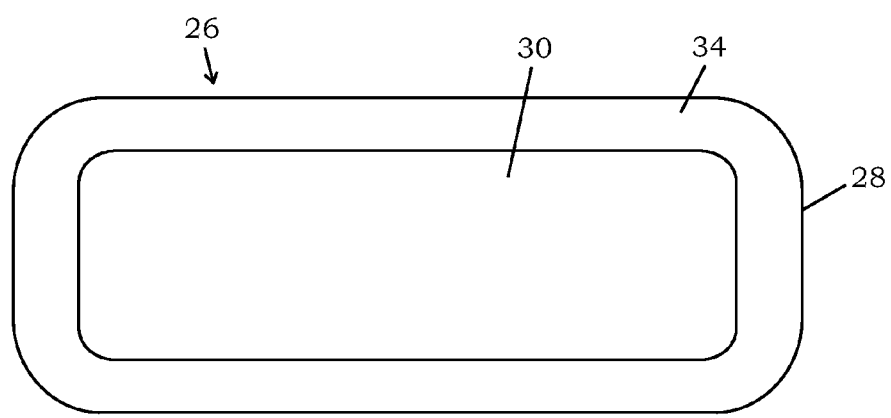
FIG. 3 is a top view of the stack of FIG. 2.

FIG. 2 shows an example of the stack 26 for use in the method outlined above. FIG. 3 shows a top view of the stack 26 shown in FIG. 2. Referring to FIG. 2, the stack 26 includes one or more preformed materials 28 and one or more forming molds 30. Typically, the stack 26 includes an equal number of preformed materials 28 and forming molds 30, with an alternating arrangement of the preformed materials 28 and forming molds 30 including the preformed material 28 being below the forming mold 30. Each of the preformed materials 28 may be in the form of a flat or planar sheet. The preformed flat material 28 may have any desired outline shape, for example, without limitation, rectangular, rounded-rectangular, oval, and square. For example, as shown in FIG. 3, the preformed material 28 may have a rounded-rectangular outline shape. Typically, the outline shape of the preformed material 28 will mimic the outline shape of the adjacent forming mold 30. Preformed materials 28 made of a glass-containing material, such as glass or glass-ceramic, are selected to form shaped glass articles. Returning to FIG. 2, each forming mold 30 has a shaped surface 32 having a desired surface profile of the shaped article to be formed and a top surface 33. The top surface 33 may be flat or shaped.

Figure 4:
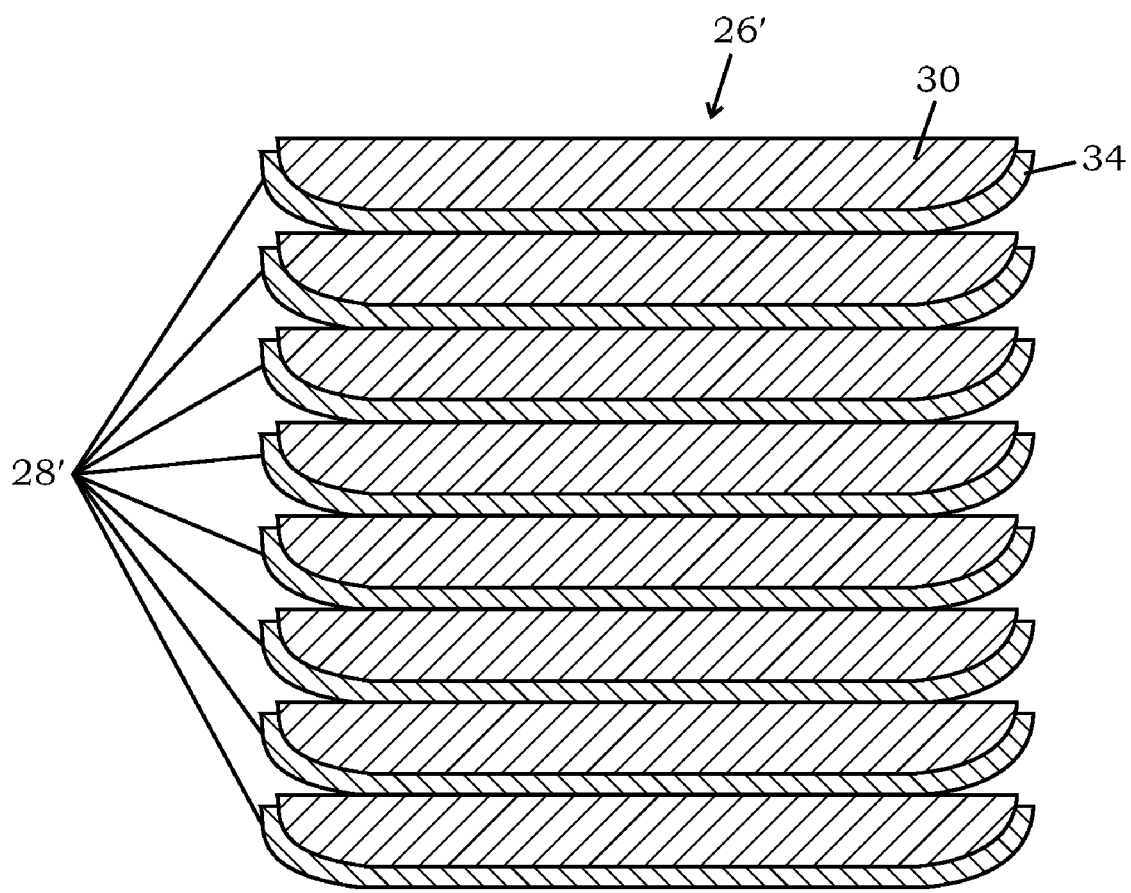
FIG. 4 is a cross-section of a stack of shaped articles.

For each adjacent set 27 of preformed material 28 and forming mold 30, the preformed material 28 in the set is oversized relative to the forming mold 30 in the set. As shown in FIGS. 2 and 3, the arrangement of the preformed material 28 and forming mold 30 in each adjacent set is such that an edge portion 34 of the oversized preformed material 28 extends beyond the periphery of the forming mold 30. For each adjacent set of preformed material 28 and forming mold 30, the size of the edge portion 34 of the preformed material 28 that extends beyond the periphery of the forming mold 30 will be determined by the surface area of the portion of the shaping surface (32 in FIG. 2) of the forming mold 30 to be covered by the edge portion 34. FIG. 4 shows stack 26', where the edge portions 34 of the preformed materials 28 have been folded into contact with the shaping surfaces 32 of the forming molds 30 to form the shaped articles. A procedure for molding the edge portions 34 to the shaping surfaces 32 has been described above and will be described in further detail below.

The shaping surfaces 32 of the forming molds 30 in the stack 26 may have different or the same surface profiles across the stack 26. When the shaping surfaces 32 have different surface profiles, different shaped articles can be formed from a single run of the stack 26 through the heated channel and constriction. The difference in surface profiles may come from the shapes or sizes of the preformed materials 28 and forming molds 30. The shaping surfaces 32 of the forming molds 30 may be smooth or may incorporate indicia, such as ridges, dimples, and grooves. Indicia on the shaping surfaces 32 of the forming molds 30 will be impressed on the preformed materials 28 through contact between the preformed materials 28 and the forming molds 30. The top surfaces 33 of the forming molds 30 may also incorporate indicia, such as ridges, dimples, and grooves, that can be impressed on the preformed materials 28 through contact between the preformed materials 28 and the top surfaces 33.

Since the forming molds 30 make contact with the preformed materials 28, it is necessary to give attention to the material used in making the forming molds 30. The forming mold 30 should be able to withstand high temperatures since the stack 26 would have to be heated to an elevated temperature at which the preformed materials 28 can be reformed. At this elevated temperature, there should be no chemical interaction between the forming molds 30 and the preformed materials 28. Therefore, the forming molds 30 should be made of an "inert" and heat-resistant material. In addition to the above, it is important to minimize mismatch in coefficient of thermal expansion (CTE) between the forming molds 30 and the preformed materials 28. In some examples, the forming molds 30 may be made of a material having a CTE within ±20×10⁻⁷/° C. of the CTE of the preformed materials 28. For preformed materials 28 containing glass, the forming molds 30 may be made of materials such as glass and graphite. In addition, the forming molds 30 may be coated with a non-stick material to prevent sticking of the preformed materials 28 to the forming molds 30. Examples of suitable non-stick materials include boron nitride, calcium hydroxide, and carbon soot. The non-stick material preferably has a comparable CTE to the material of the forming mold 30.

Figure 5:
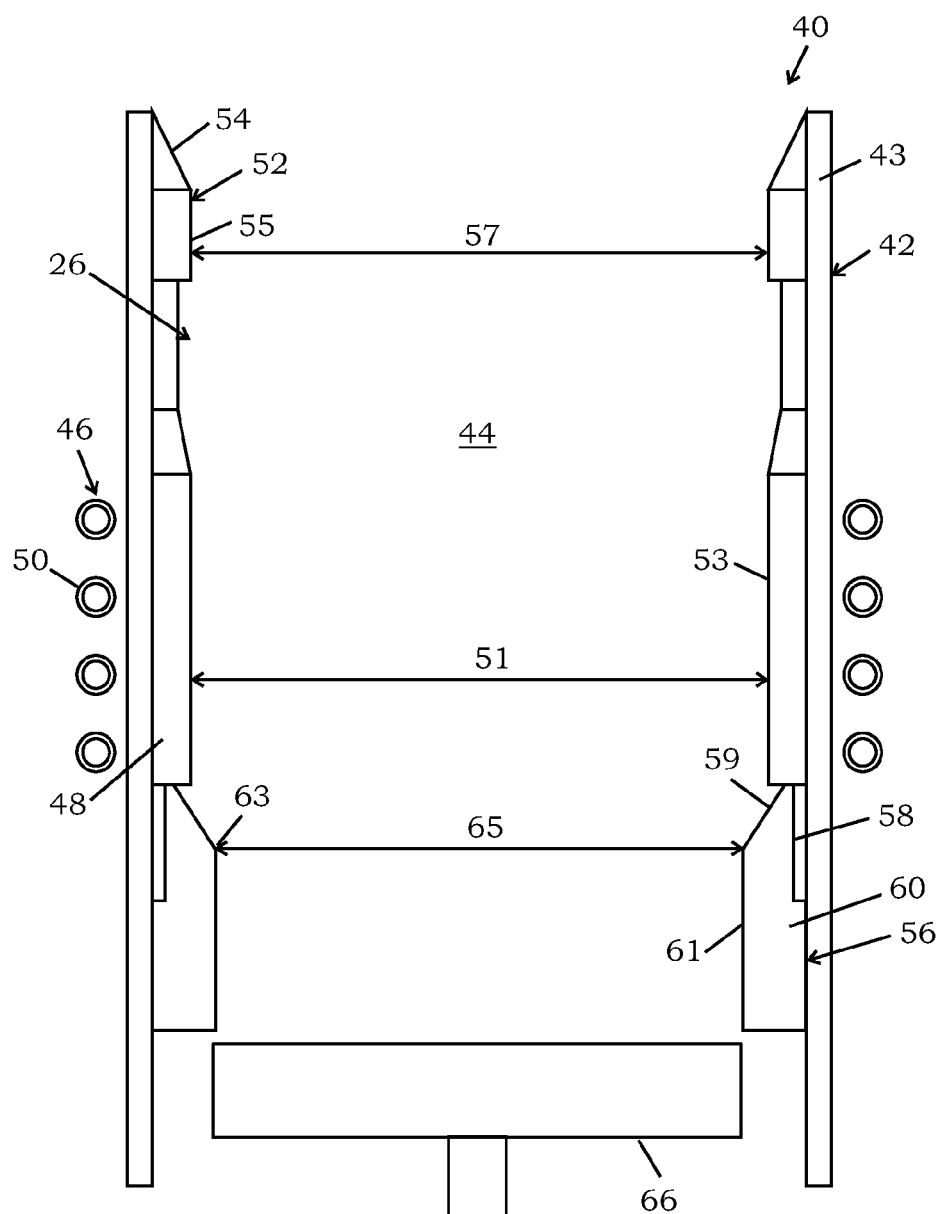
FIG. 5 is a cross-section of an apparatus for making shaped articles.

FIG. 5 shows an apparatus 40 for forming shaped articles according to the method outlined in FIG. 1. The apparatus 40 includes a chamber 42 having a chamber wall 43 that defines a channel 44. A heater 46 is disposed adjacent to the chamber wall 43 to provide heat to the channel 44. In the method outlined in FIG. 1, the channel 44, which is heated by the heater 46, serves as the heated channel. In general, the heater 46 provides localized heat so that a different temperature regime, such as cooling regime, can be established in another section of the channel 44. Any suitable heater 46 may be used to deliver heat to the channel 44. In one example, the heater 46 is an induction heater and includes a susceptor 48 disposed within an induction coil 50. A magnetic field is generated by running alternating current through the induction coil 50. The magnetic field induces eddy currents in the susceptor 48 to generate localized heat. In the illustrated example, the susceptor 48 is disposed inside the chamber 42 while the induction coil 50 is disposed outside of the chamber 42. Typically, the susceptor 48 is concentric with the induction coil 50. With the susceptor 48 and induction coil 50 on opposite sides of the chamber wall 43, the chamber wall 43 would have to be made of a magnetically-permeable material to allow the susceptor 48 to see the magnetic field generated by the induction coil 50. The materials of the susceptor 48 and chamber wall 43 are preferably ones that can withstand high temperature and that would not produce contaminants when exposed to high temperature. The susceptor 48 may be made of, for example, graphite, and the chamber wall 43 may be made of, for example, glass, e.g., silica. Where oxidizable materials such as graphite are used in any of the parts for forming the shaped articles, an inert atmosphere may be provided within the chamber 42, e.g., by purging the chamber 42 with an inert gas such as nitrogen.

The susceptor 48 is in the form of a ring and is mounted on the chamber wall 43. It should be noted that the term "ring" does not necessarily imply that the outline shape of the susceptor 48 is circular. The outline shape of the susceptor 48 may generally follow that of the stack—one example of an outline shape is shown in FIG. 3. The inner diameter 51 of the susceptor 48 is at least equal to, possibly slightly larger than, the outer diameter of the stack (26 in FIG. 2) so that the stack can be transported through the susceptor 48. The inner surface 53 of the susceptor 48 may be coated with a non-stick material to assure smooth transit of the stack through the susceptor 48, i.e., without "shaping" contact between the stack and the inner surface 53. Materials such as boron nitride may be used as the non-stick material. In general, the span of the susceptor 48 along the chamber wall 43 defines the circumferential region of the channel 44 to which the heat from the susceptor 48 would be directly applied. The heat in this circumferential region can move towards the center of the channel 44 via one or more of the different modes of heat transfer.

A centralizing ring 52 is mounted on the chamber wall 43, near the entrance of the chamber 42, and above the susceptor 48. The centralizing ring 52 is axially aligned with the channel 44 and susceptor 48. The centralizing ring 52 may have a flared portion 54 to facilitate loading of the stack (26 in FIG. 2) into the channel 44 and a tube portion 55 to centralize the stack within the channel 44. The inner diameter 57 of the centralizing ring 52 is at least equal to, possibly slightly larger, than the outer diameter of the stack so that the stack can be conveyed through the centralizing ring 52 to the susceptor 48. As in the case of the susceptor 48, the shape of the tube portion 55 would generally track that of the stack to be received in the channel 42. As in the case of the susceptor 48, the flared portion 54 and tube portion 55 of the centralizing ring 52 may be coated with a non-stick material to assure smooth transit of the stack through the centralizing ring 52. The centralizing ring 52 may be made of a heat-resistant material, and preferably one that won't generate contaminants in the presence of elevated temperature. Examples of materials for the centralizing ring 52 include those described above for the susceptor 48.

Figure 6:
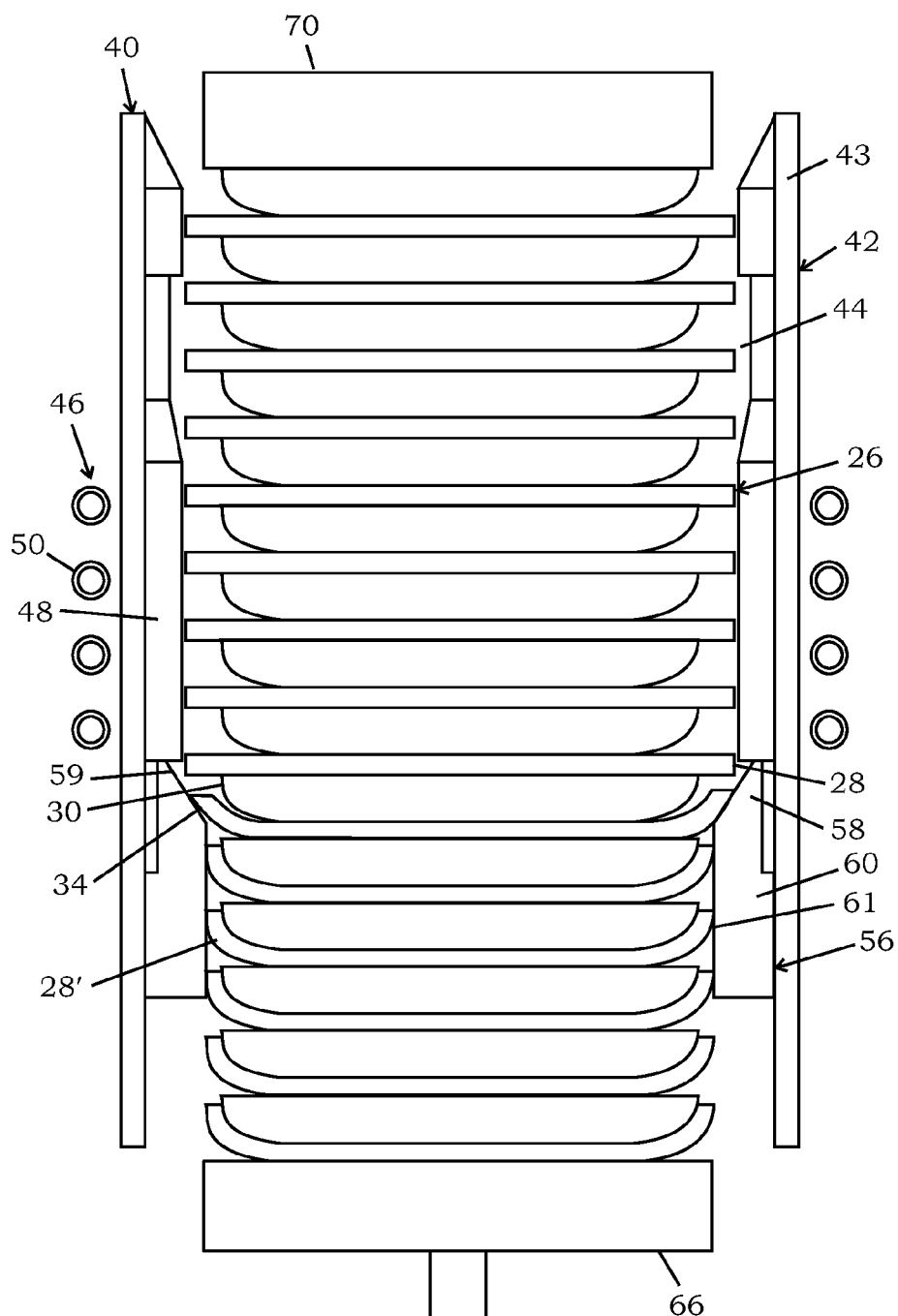
FIG. 6 shows a stack as illustrated in FIG. 2 disposed within the apparatus of FIG. 5.

A forming ring 56 is mounted on the chamber wall 43, below the susceptor 48. The forming ring 56 provides the constriction or "funnel" described in the method of FIG. 1. The forming ring 56 has an upper portion 58 and a lower portion 60. At the intersection 63 of the upper portion 58 and the lower portion 60, the inner diameter 65 of the forming ring 56 is smaller than the inner diameter 51 of the susceptor 48. Above the intersection 63, the inner surface 59 of the upper forming ring portion 58 is beveled. Below the intersection 63, the inner surface 61 of the lower forming ring portion 60 is straight, i.e., has substantially the inner diameter 65. Thus, a stack having an outer diameter that is essentially the same as the inner diameter 51 of the susceptor 48 would encounter the inner surface 59 while descending through the upper forming ring portion 58 into the lower forming ring portion 60. As illustrated in FIG. 6, the combination of the beveled inner surface 59 and the descent of the stack 26 through the upper forming ring portion 58 results in folding of the edge portions 34 of the preformed materials 28 in the stack 26 into contact with the shaping surfaces 32 of the forming molds 30 in the stack 26. The preformed materials 28 with the folded edge portions 34 are the shaped articles 28'. Folding of the edge portions 34 occurs progressively along the stack 26 as the stack 26 is advanced through the forming ring 56. In the lower portion 60, the inner surface 61 maintains the edge portions 34 of the preformed materials 28 in the folded position. It should be noted that the inner diameter (65 in FIG. 5) of the forming ring 56 is roughly equal to the final diameter of the shaped article 28' or the diameter of the forming mold 30 plus a thickness of the preformed material 28. The forming ring 56 may be made of a heat-resistant material, and preferably one that won't generate contaminants in the presence of elevated temperature. Examples of materials for the forming ring 56 include those described above for the susceptor 48. Since the preformed materials 28 will come into contact with the forming ring 56, the inner surfaces 59, 61 of the forming ring 56 may be coated with a non-stick material, as described above.

FIG. 6 shows that the stack 26 is supported on a platform 66. A motion device 68 is coupled to the platform 66 to move the platform 66 and the stack 26 supported on it along the channel 44. Any suitable motion device 68, such as a fluid-powered cylinder, may be used. FIG. 6 also shows a weight member 70 positioned on the stack 26. The weight member 70 applies a compressive force to the stack 26, which would assist in maintaining proper alignment and contact between the forming molds 30 and the preformed materials 28 in the vertical direction. For example, the weight member 70 may apply a force in a range from 50 to 100 N to the stack 26. Although not shown in FIG. 5 or 6, a conveyor system may be provided for transporting the stack 26 to the apparatus 40 and for transporting shaped articles 28' and forming molds 30 away from the apparatus 40.

A method of forming shaped articles has been illustrated in FIG. 1. An apparatus 40 for forming the shaped articles has been described with reference to FIGS. 5 and 6. The stack 26 used in forming the shaped articles has been described with reference to FIGS. 2-4. The following now pertains to additional process details of the method.

Referring to FIG. 6, the stack 26 is heated within the channel 44 by heat from the heater 46. The heat is applied along the circumference of the stack 26, which generally results in a temperature differential between the circumferential region (or periphery) of the stack 26 and the central region (or center) of the stack 26. In some examples, the heat is applied circumferentially such that a temperature differential in a range from about 30° C. to 80° C., typically of about 50° C., exists between the circumferential region of the stack 26 and the central region of the stack 26. Where the preformed materials 28 are glass sheets having pristine surfaces, such temperature differential may assist in maintaining the pristine quality of the surfaces after the shaped articles are formed from the glass. The heating of the stack 26 is such that by the time the preformed materials 28 reach the forming ring 56, they are at the proper temperature to be reformed. This proper temperature, referred to as the forming temperature, is near the softening temperature. "Near" may be defined as within 100° C. of the softening temperature. For glass-containing preformed material, the forming temperature may be in a range from 10° C. to 70° C. below the softening temperature of the preformed material, for example. Heating of the stack 26 may be progressive, i.e., the temperature of the stack 26 may increase generally along the stack 26 in the travel direction of the stack 26. Active heating generally does not occur below the forming ring 56. This allows the stack 26 to progressively cool down as it is transported further down the channel 44 and below the forming ring 56. In other words, the portion of the stack 26 upstream of the forming ring 56 is progressively heated to the forming temperature while the portion of the stack 26 downstream of the forming ring 56 is progressively cooled, or allowed to cool, to the removal temperature. The translation rate of the stack 26 should be such that the shaped articles 28' are sufficiently cooled by the time they reach the bottom of the channel 44, where they will be unloaded from the channel 44. The shaped articles 28' are cooled or allowed to cool down to a removal temperature below the forming temperature, and typically below the strain point of the preformed material. For glass-containing preformed materials, the shaped articles 28' may be allowed to cool down to a temperature of at least 10° C. below the glass strain point. After the shaped articles 28' are sufficient cool, they are removed from the channel 44 and separated from the forming molds 30. The process may be continuous, where additional sets of preformed materials 28 and forming molds 30 are added to the top of the stack 26 while shaped articles 28' and forming molds 30 are removed from the bottom of the stack 26. Once removed from the channel 44, additional processing of the shaped articles 28' may include one or more of annealing, finishing, e.g., by fire polishing, and strengthening.

In one example, the shaped articles 28' are made of a glass-containing material that can be chemically-strengthened by ion-exchange. Typically, the presence of small alkali metal ions such as $Li^+$ and $Na^+$ in the glass structure that can be exchanged for larger alkali metal ions such as $K^+$ render the glass composition suitable for chemical strengthening by ion-exchange. The base glass composition can be variable. For example, U.S. patent application Ser. No. 11/888,213 (now U.S. Pat. No. 7,666,511), assigned to the instant assignee, discloses alkali-aluminosilicate glasses that are capable of being strengthened by ion-exchange and down-drawn into sheets. The glasses have a melting temperature of less than about 1650° C. and a liquidus viscosity of at least about $1.3 \times 10^5$ Poise and, in one embodiment, greater than about $2.5 \times 10^5$ Poise. The glasses can be ion-exchanged at relatively low temperatures and to a depth of at least 30 μm. Compositionally the glass comprises: 64 mol % ≤ $SiO_2$ ≤ 68 mol %; 12 mol % ≤ $Na_2O$ ≤ 16 mol %; 8 mol % ≤ $Al_2O_3$ ≤ 12 mol %; 0 mol % ≤ $B_2O_3$ ≤ 3 mol %; 2 mol % ≤ $K_2O$ ≤ 5 mol %; 4 mol % ≤ $MgO$ ≤ 6 mol %; and 0 mol % ≤ $CaO$ ≤ 5 mol %, wherein: 66 mol % ≤ $SiO_2+B_2O_3+CaO$ ≤ 69 mol %; $Na_2O+K_2O+B_2O_3+MgO+CaO+SrO > 10$ mol %; 5 mol % ≤ $MgO+CaO+SrO$ ≤ 8 mol %; $(Na_2O+B_2O_3)-Al_2O_3$ ≤ 2 mol %; 2 mol % ≤ $Na_2O-Al_2O_3$ ≤ 6 mol %; and 4 mol % ≤ $(Na_2O+K_2O)-Al_2O_3$ ≤ 10 mol %.

The ion-exchange process typically occurs at an elevated temperature range that does not exceed the transition temperature of the glass. The glass is dipped into a molten bath comprising a salt of an alkali metal, the alkali metal having an ionic radius that is larger than that of the alkali metal ions contained in the glass. The smaller alkali metal ions in the glass are exchanged for the larger alkali metal ions. For example, a glass sheet containing sodium ions may be immersed in a bath of molten potassium nitrate ($KNO_3$). The larger potassium ions present in the molten bath will replace smaller sodium ions in the glass. The presence of the large potassium ions at sites formerly occupied by sodium ions creates a compressive stress at or near the surface of the glass. The glass is then cooled following ion exchange. The depth of the ion-exchange in the glass is controlled by the glass composition. For potassium/sodium ion-exchange process, for example, the elevated temperature at which the ion-exchange occurs can be in a range from about 390° C. to about 430° C., and the time period for which the sodium-based glass is dipped in a molten bath comprising a salt of potassium can range from about 7 up to about 12 hours (with less time being required at high temperatures, and more time being required at lower temperatures). In general, the deeper the ion-exchange, the higher the surface compression and the stronger the glass can be.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for making shaped articles, comprising:
    forming a stack of alternating preformed materials and forming molds, each of the preformed materials being made of glass or glass-ceramic, each of the forming molds having a shaping surface with a desired profile of a shaped article, the forming of the stack comprising placing a first adjacent set of preformed material and forming mold on top of a second adjacent set of preformed material and forming mold, the preformed material and forming mold in each adjacent set being arranged such that one of the surfaces of the preformed material is in contact with the shaping surface of the forming mold and an edge portion of the preformed material extends beyond a periphery of the forming mold;
    heating the stack;

advancing the stack through a constriction that has an internal surface configured to fold the edge portion of the preformed material in each adjacent set into contact with the shaped surface of the forming mold in the adjacent set as the edge portion passes through the constriction, thereby forming a shaped article from the preformed material in each adjacent set; and separating the shaped article from the forming mold for each adjacent set.

2. The method of claim 1, wherein the preformed material is made of glass.

3. The method of claim 2, wherein in the heating the stack step, the stack is heated to a forming temperature near a softening point of the glass.

4. The method of claim 3, wherein in the heating the stack step, a temperature differential exists between the periphery of the stack and the center of the stack.

5. The method of claim 3, further comprising cooling the stack to a removal temperature below the forming temperature.

6. The method of claim 5, wherein the removal temperature is below a strain point of the glass.

7. The method of claim 1, further comprising adding adjacent sets of preformed materials and forming molds to the end of the stack upstream of the constriction and removing adjacent sets of shaped articles and forming molds from the end of the stack downstream of the constriction.

8. The method of claim 1, wherein each of the preformed materials is made of glass and a portion of the stack upstream of the constriction is heated to a forming temperature below a softening point of the glass in the heating the stack step.

9. The method of claim 8, further comprising cooling a portion of the stack downstream of the constriction to a removal temperature below a strain point of the glass.

10. The method of claim 1, wherein each of the preformed materials is made of glass, and further comprising at least one of annealing the shaped articles, finishing the shaped articles, and chemically-strengthening the shaped articles.

11. The method of claim 1, further comprising applying a compressive force to the stack while heating the stack and advancing the stack through the constriction.

12. The method of claim 1, further comprising providing an inert atmosphere around the stack at least while heating the stack.

* * * * *